June 6, 1967  H. COHEN  3,324,314
DEVICES FOR THE CONVERSION OF THERMAL ENERGY
INTO ELECTRIC ENERGY
Original Filed Dec. 7, 1959   3 Sheets-Sheet 1

Haim Cohen
Inventor

By Karl F. Ross
Agent

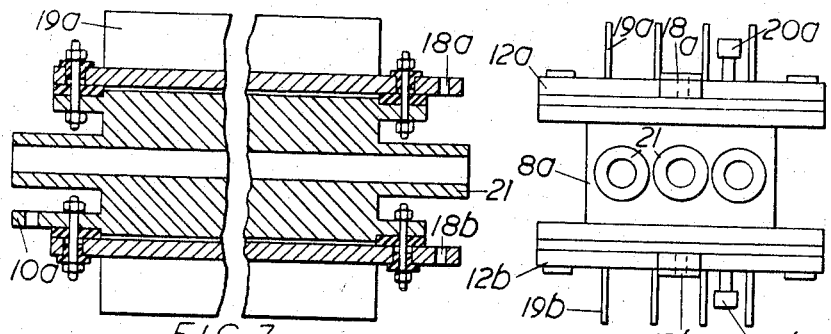
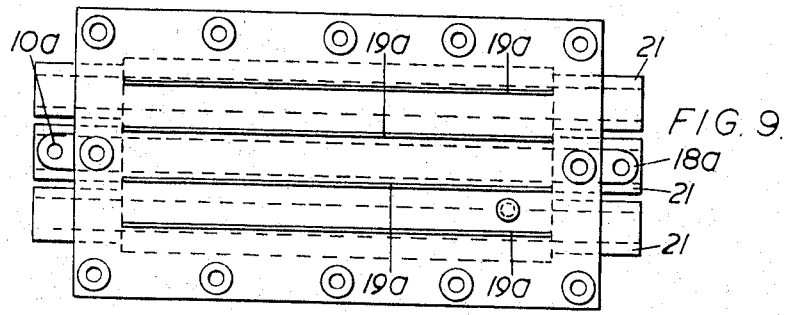
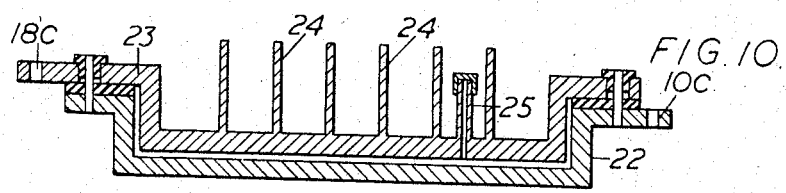
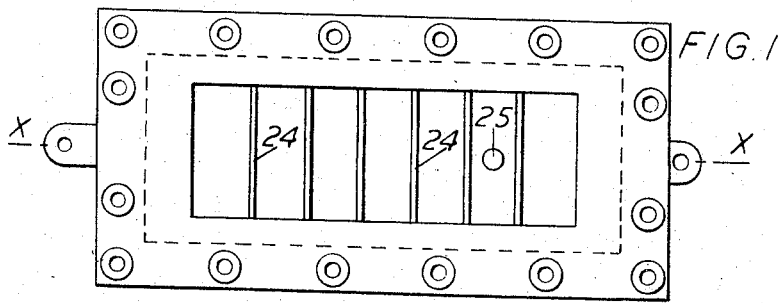

June 6, 1967  H. COHEN  3,324,314
DEVICES FOR THE CONVERSION OF THERMAL ENERGY
INTO ELECTRIC ENERGY
Original Filed Dec. 7, 1959  3 Sheets-Sheet 3

Haim Cohen
Inventor

By Karl F. Ross
Agent

United States Patent Office 3,324,314
Patented June 6, 1967

3,324,314
DEVICES FOR THE CONVERSION OF THERMAL
ENERGY INTO ELECTRIC ENERGY
Haim Cohen, 22 Bar-Giora St., Haifa, Israel
Continuation of application Ser. No. 857,648, Dec. 7,
1959. This application Feb. 16, 1965, Ser. No. 435,405
Claims priority, application Israel, Dec. 31, 1958,
12,080
17 Claims. (Cl. 310—4)

This application is a continuation of applicant's prior application, Ser. No. 857,648, filed Dec. 7, 1959, now abandoned.

This invention relates to a device for converting thermal energy into electrical energy and is particularly concerned with a thermionic diode energy converter.

Such converters transform the thermal energy, used for heating the cathode of the diode, into an electric current resulting from the emission of electrons from the heated cathode which, when emitted, travel towards the anode thereby transporting the electric current. If now the diode is connected to an electric load the electric energy produced by the conversion of the thermal energy can be used to perform work.

A serious limitation in the development of such thermionic diode energy converters arises in view of the phenomenon of space charge. Such space charges consist of negatively charged electrons which accumulate in the vicinity of the cathode and inhibit the flow of electrons from the cathode to the anode. It has been realised that the development of thermionic diode energy converters which would be capable of effective power production is dependent on overcoming the problems raised by the space charge formation. For this purpose various proposals have been made in the past. One such proposal involves the introduction of an alkali metal vapour, generally cesium, into the diode enclosure, this vapour is ionised and the ionised atoms are relied upon to neutralise the space charge set up as a result of the emission of the electrons from the cathode. It has been found in practice however, that the use of such alkali metal vapours carries with it certain serious disadvantages particularly in view of the corrosive nature of the vapour and also in view of the necessity of maintaining the device, containing the vapour, within strictly governed temperature limits. It is particularly in view of these disadvantages that this solution for space charge problems has not led to any significant development of an effective converter device.

It has also been suggested that the effects of space charge formation can be wholly or partly overcome by reducing the distance between the cathode to the anode to a very small amount. This suggestion has however not been proceeded with and it has theoretically been deduced that it is not practicable seeing that spacings of less than 0.01 mm. would have to be provided in order to achieve reasonable output.

The present invention is based on the phenmenon that, with a cathode of a material of relatively high work function $\varphi_c$ and with an anode of a material of relatively low work function $\varphi_a$, an accelerating electrostatic potential is developed between the electrodes. When the latter are disposed in an evacuated enclosure and separated by a spacing which is less than 0.1 mm., this electrostatic potential is sufficient to accelerate the electrons emitted by the heated cathode across the gap with sufficient energy to prevent the formation of a space charge in the gap or to reduce its effect. It is true that in the movement of the electrons across the gap some of the potential energy of the electrons is transformed into kinetic energy which is dissipated as heat when the electrons strike the anode. In view however of the narrowness of the inter-electrode gap the electrons retain sufficient potential energy to perform useful work.

Such a device overcomes the space charge without the disadvantages inherent in the use of alkali metal vapours. In particular, the design of the device for use under vacuum conditions is particularly advantageous when the device is used in space, the ambient pressure there prevailing being far below that obtainable in an evacuated enclosure in the laboratory. Thus the housing employed for such an evacuated device for use in space need not have such a high degree of sealing as it would require were it to contain metal vapours.

Furthermore, a device in accordance with the invention can have inter-electrode spacings which are readily attainable in practice and yet achieve appreciable efficiencies.

For the sake of simplicity, in the following description a device in accordance with the invention will be referred to as a "generator."

The invention is illustrated, by way of example only, in the accompanying drawing in which:

FIGS. 7, 8 and 9 are an axial section, an end view and a plan view, respectively, of another generator;

FIG. 10 is a section on line X—X of FIG. 11 of yet another generator;

FIG. 11 is a plan view corresponding to FIG. 10;

Figure 1:
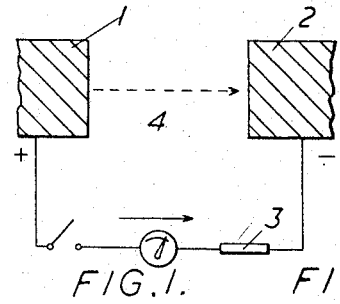
FIG. 1 is a diagrammatic representation of a generator according to the invention.

The generator according to FIG. 1 comprises a cathode 1 consisting of a metal having a comparatively high work function, e.g. platinum, tungsten, molybdenum or tantalum and an anode 2 whose work function is low, e.g. a metal coated with an alkali-metal oxide or an alkaline-earth-metal oxide. For the sake of simplicity such coatings will hereinafter be referred to as "oxide coating" and the coated metals as "oxide-coated metals." Those parts of the electrodes which face each other are disposed within an evacuated enclosure (not shown). Their other ends are electrically interconnected by an outer circuit including a load 3. Between the electrodes there exists an intrinsic electrostatic field which has the anode as positive pole and the cathode as negative pole, whereby electrons thermally emitted from cathode 1 are accelerated towards the anode, as indicated by the arrow 4, while as a result a current flows in the outer circuit.

It is known that, for a given accelerating field in a thermionic tube, the intensity of the anode current is inversely proportional to the square of the distance between the anode and the cathode or between the anode and the space-charge layer covering the cathode, as the case may be. Accordingly, in order to increase the anode current, the distance between the electrodes has to be decreased as much as possible. For the purposes of this invention a distance less than 0.10 mm. and preferably of the order of 0.025 mm. seems to be suitable.

The maximal E.M.F. in volts of a generator according to the invention is numerically equal to $\varphi_c - \varphi_a$, $\varphi_c$ and $\varphi_a$ being the work functions of the cathode and the anode, respectively, in electron volts. Although it is known from the literature that the work function $\varphi$ of a material increases with the temperature, the electrode materials employed are such that the difference $\varphi_c - \varphi_a$ is very much greater than would be obtainable with other materials relying only on the increment in the work function of the cathode when heated to any practical temperature.

In the choice of the composition of the electrodes the following has to be considered: The cathode has to be of a material of as high a work function as possible and at the same time it must not melt at the operating temperature while its heat emissivity should be as low as possible. It has been found that tungsten and nickel-plated copper are very suitable as cathode materials; also suitable are Ta, Mo, Ni, Pt, tungsten or platinum coated with a molecular film of oxygen or hydrogen, and nickle-coated with a molecular oxygen film. All these materials have work functions between 4 and 6.5 electron volts. The anode material should have as low a work function as possible. Oxide-coated metals may advantageously be used. In particular a mixture of oxides of alkali metals and of alkaline earth metals is suitable as the work function of such a mixture is as low as about one e.v.

It is known that the higher the work function of a material, the higher is the temperature at which it will begin to emit electrons and thus, in order to obtain an appreciable emission, very high temperatures must be attained. Therefore, the choice of the material of the cathode will be determined not only by the fact that the work function should be high, but also by the available temperature. If only moderate heat sources are available, an upper limit on the choice of work function is indicated. Other factors, such as the coefficient of expansion of the electrodes and their cost, will also have to be considered.

Figures 2, 3:
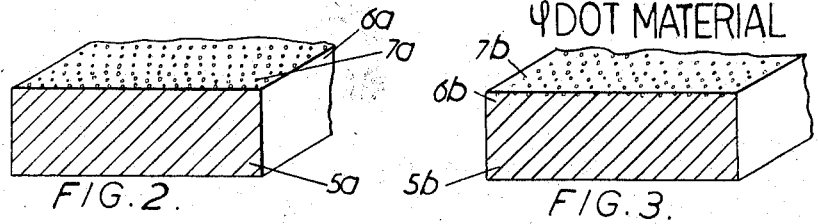
FIGS. 2 and 3 are cross-sections of examples of cathodes for use in a generator according to the invention.

The use of a material of high work function for the cathode means that considerable energy has to be spent for the operation of the generator. The reason for this is that emitters of high work function require both more energy and higher temperatures, and the higher the temperature of the cathode the greater are the heat losses by thermal radiation. With a cathode made from one of the materials listed above, and an anode of an oxide-coated metal, the efficiency of a generator does not exceed a few percent and will in most cases be even lower. Therefore, the cathode should be designed to have a relatively high work function and at the same time to be capable of emitting electrons at relatively low temperatures. This, according to a preferred embodiment of the invention, can be achieved by employing a cathode formed of a mixture of high work function material (for the production of an accelerating electrostatic potential) and low work function material (for effective emission). A preferred example of such mixed cathode is, what will be referred to hereinafter as a "dotted cathode," i.e. a cathode consisting mainly of a material of high work function but having its surface dotted with discrete particles or dots of a material of lower work function. Such dotted cathodes are illustrated in FIGS 2 and 3. The dotted cathode according to FIG. 2 comprises a body 5a of a metal of compartively high work function on whose surface 6a small discrete dots 7a of oxide are applied. The dots 7a are more or less evenly distributed on the surface 6a so that only a part of the latter is covered.

According to the embodiment of FIG. 3 the dots 7b are sunk into the surface 6b and are thus flush with the latter. This embodiment has the advantage that the cathode has a smooth surface which is important in generators in which the distance between cathode and anode has to be very small. It is preferred to make the cathode dots of the same material as the anode in order to avoid so-called dusting effects and consequent changes in the work function of the anode during the use of the generator.

Figure 4:
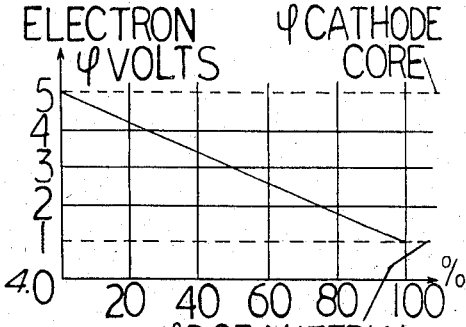
FIG. 4 is a diagram showing certain characteristics of a cathode according to FIG. 2 or 3.

FIG. 4 is a diagram in which the percentage of cathode surface covered by the oxide is plotted on the abscissa against the work function of the cathode as ordinate. The diagram shows that the overall work function of the cathode is the lower, the larger the oxide-covered area of the surface. If, for example, a metal whose $\varphi$ is 5 e.v. is covered to an extent of about 30% of its surface with dots of an oxide whose $\varphi$ is 1 e.v., its overall $\varphi$ is reduced to 3.8 e.v. and the difference $\varphi_c - \varphi_a$ is reduced from 4 to 2.8 e.v., i.e. likewise by 30%. This loss in intensity of the field is more than made up by the output current, and consequently by the resulting gain in the efficiency of the generator. The curve of FIG. 4 is plotted on the assumption that the decrease of work function with the oxide-coated area of the cathode surface is linear. It is believed that this is a fair assumption, but even if the curve were not linear, the general trend would remain the same.

The so-called impregnated cathodes or dispenser cathodes consisting of sintered particles of materials of different work functions e.g. tungsten and alkali oxides may also be advantageously used.

With electrodes of the type illustrated in FIGS. 2 and 3 a suitable working temperature of the generator is in the vicinity of 700 to 1000° C. depending on the nature of the oxide used. Owing to the great proximity of the anode to the cathode the anode is exposed to heat radiation from the cathode and to heating by high velocity electrons incident on the anode and has to be cooled, as otherwise it would also emit electrons whereby space charges would be formed. This can be done, for example, by providing the anode with fins extending from its outer face, or by any other suitable means. If desired, the heat from the anode can also be used for the generation of electric energy by being conveyed to a thermopile. In this way the overall efficiency of the generator can be increased.

The heat sources used for operating the generator may be of various kinds and can be specially generated or taken from an existing source, and heating of the cathode can be by way of conduction, radiation or convection. If, for example, the generator is to be installed in a jet-propelled aeroplane or missile, the exhaust gases can be used as a source of thermal energy. Hot liquids may also be used where available, e.g. molten metals. In industrial plants where hot surfaces are available, e.g. of furnaces or the like, these furnaces may be used as a source of thermal energy; in such a case the cathode of the generator will have a bottom matching the hot surface. Solar radiation or a nuclear reactor can also be used as a source of thermal energy.

In cases in which a hot fluid is used as the source of thermal energy, the efficiency of conversion can be increased by combining in tandem a plurality of generators in the following manner: The working temperature of the first generator, i.e. the one receiving first the hot fluid, is higher than that of the second generator which receives the somewhat cooler fluid discharged from the first generator. This can be repeated several times, until the fluid is cooled to such an extent that it cannot be used any further for the operation of a generator according to the invention.

Figure 5:
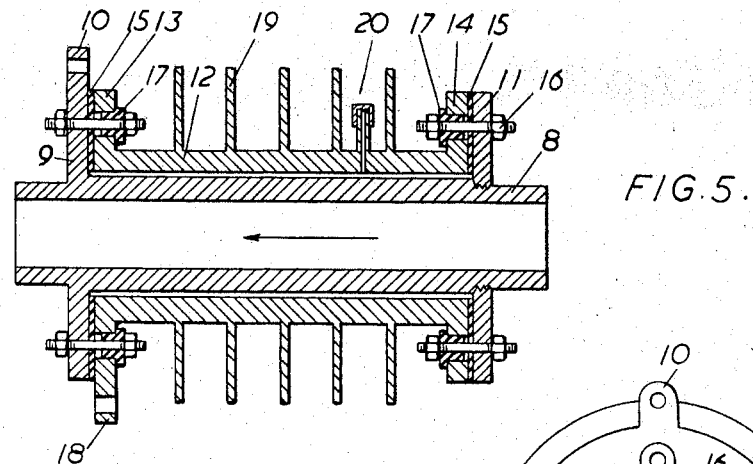
FIGS. 5 and 6 are an axial section and an end view, respectively, of a generator according to the invention.
Figure 6:
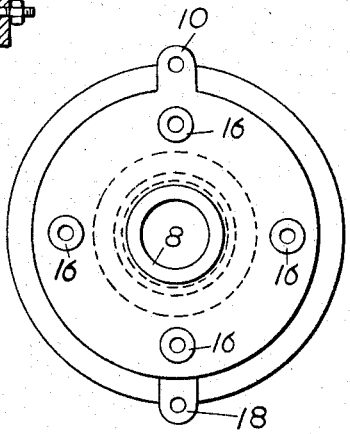

The generator illustrated in FIGS. 5 and 6 is designed for the utilization of hot fluids as the source of thermal energy. The generator comprises a hollow tubular cathode 8 which has near its left-hand side (with reference to FIG. 5) a flange 9 provided with a terminal 10. Near its right-hand end part the cathode 8 has an outer screw thread onto which a tapped disc 11 is screwed which serves as a second flange. The anode 12 is cylindrical and coaxially surrounds the cathode at a small distance therefrom, e.g. of the order of 0.02 to 0.05 mm. It is provided with two flanges 13 and 14 by means of which it is fixed to the flanges 9 and 11 of the cathode, with the interposition of electrically insulating gaskets 15. Flange 13 comprises a terminal 18. The flanges of the anode and the cathode are secured together by bolts 16 with the interposition of electrically insulating washers 17 surrounding the bolts. On the outer face of the anode 12 there are disposed a plurality of heat-dissipating fins 19. A nipple 20 containing a valve (not shown) is provided in the anode for the evacuation of the inter-electrode space.

For operating the generator, hot fluids are continually fed to one end of the cathode 8 and evacuated from the opposite end. The terminals 10 and 18 are connected to an outer electric circuit. Two or more such generators may be combined in series or in parallel.

If so desired, the fins 19 may be replaced by thermocouples or a thermopile, whereby the heat dissipated from the anode can be utilized for the generation of additional electric energy. In such a case the thermo-couple or thermo-pile will have to be electrically insulated from the anode.

The embodiment of the invention illustrated in FIGS. 7, 8 and 9 is in principle similar to that of FIGS. 5 and 6. It comprises a block-shaped cathode 8a traversed by three parallel hot-fluid ducts 21. Juxtaposed with the cathode block 8a are two anodes 12a and 12b, each with the interposition of an electrically insulating packing gasket, each anode being provided with fins 19a, 19b and with a valve-containing nipple 20a, 20b. The cathode is thus common to two generators each of which has its own anode. From the terminals 10a, 18a and 18b, the resulting current can be drawn off.

The generator according to FIGS. 10 and 11 is adapted for the utilization of the thermal energy of a hot surface. The cathode 22 is trough-shaped and receives the equally trough-shaped anode 23. The cathode and the anode are spaced from each other and interconnected in a thermally and electrically insulating, vacuum-tight manner at their rims. Similarly as in the generators described above, the anode is provided with fins 24 and a nipple 25 with valve. The cathode and the anode have terminals 10c and 18c respectively.

Figure 12:
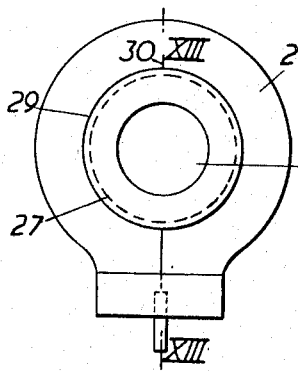
FIG. 12 is an elevation of a generator according to the invention adapted to be operated by solar heat.
Figure 13:
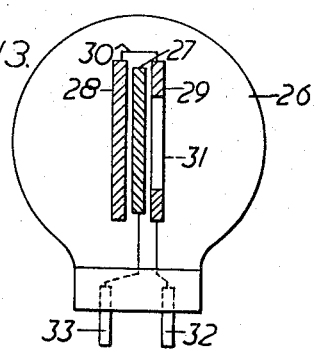
FIG. 13 is an axial section thereof on line XIII—XIII of FIG. 12.

The generator according to FIGS. 12 and 13 is adapted for the utilization of solar energy. It comprises an evacuated transparent bulb 26 inside which is mounted a cathode 27 flanked by two anode plates 28, 29 connected to each other by a link 30. Plate 29 has an opening 31 through which a beam of solar radiation can impinge on the exposed surface of cathode 27. The dimensions of the opening 31 are made so as to fit the cross-sectional area of the incoming beam. Anode plates 28, 29 are larger than cathode 27 whereby the heat carried by them can better be dissipated. Heat dissipation may be further improved by blackening those sides of the anode plates which do not face the cathode. Thus, although the solar radiation will impinge directly on the anode plate 29 as well as on the cathode 27, the construction of the former and its coating with the heat dissipating layer ensures that the temperature of the anode plate 29 is kept below that at which significant electron emission would occur. The bulb has sealed-in leads 32, 33 leading to the anode and the cathode, respectively, and connected to terminals 32a and 33a adapted for connection to a load.

Figure 14:
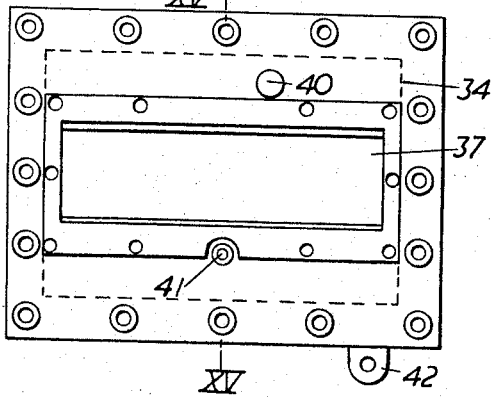
FIG. 14 is a front elevation of a further embodiment of a generator adapted for operation by solar heat.
Figure 15:
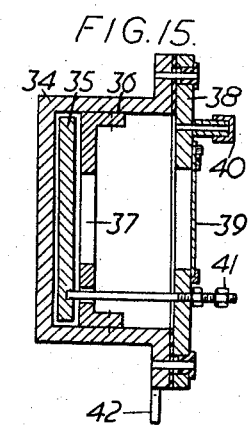
FIG. 15 is a section XV—XV of FIG. 14.

The generator according to FIGS. 14 and 15 is equally adapted for the utilization of solar radiation as a source of thermal energy. This generator is in the form of a box whose bottom and lower part of the side walls form the anode 34 while the cathode 35 is mounted in its interior at a small distance from the bottom. A frame 36 is mounted on the inner surface of the box and forms part of the anode. Through the opening 37 of frame 36 solar radiation is admitted to the cathode 35. The generator is sealed by a lid 38 provided with a transparent window 39 and a valve-containing nipple 40. From the cathode 35 there extends a terminal 41 through the lid 38. The terminal 42 of the anode is integral with the outer flange of the anode box.

Figure 16:
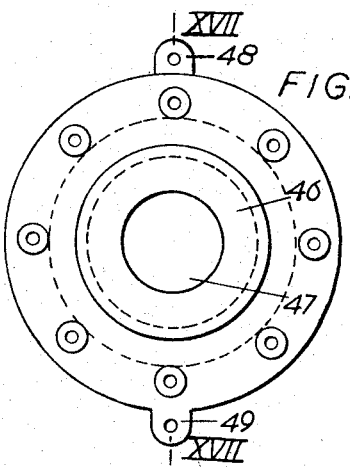
FIGS. 16 and 17 are, respectively, a front elevation and a section taken on line XVII—XVII of FIG. 16, of another embodiment of a generator according to the invention adapted for operation by solar heat.
Figure 17:
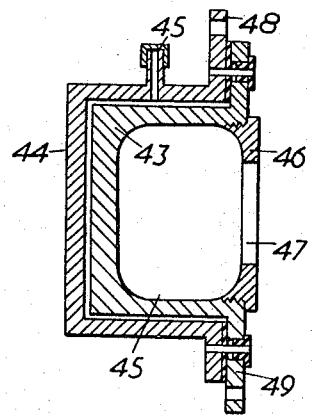

The generator according to FIGS. 16 and 17 is also adapted for the utilization of solar energy. The anode and the cathode are flanged cup-shaped bodies 43, 44. The cathode is sunk into the anode in such a manner that a small gap is left between them. The cathode and the anode are sealed to each other at their flanges in a vacuum-tight electrically and thermally insulating manner, and the anode is provided with a valve-containing nipple 45. A shutter 46 having an irradiation opening or window 47 is disposed in the front side of the cathode. Shutter 46 obstructs the path of a considerable portion of the radiation reflected back from the interior and thereby serves for the retention for an appropriate portion of the solar radiation within the space 45 of the cathode and the absorption of this radiation by the cathode. The current thereby generated can be drawn off at the terminals 48, 49.

In all the embodiments of the invention in which solar radiation is used as the source of thermal energy it is possible to use either direct or concentrated radiation. In the former case the cathode will have to be adapted to absorb and retain solar radiation to an extent sufficient to become heated to the required temperature.

I claim:

1. A device for the conversion of thermal energy into electrical energy, comprising an electron emissive cathode composed of a composition of materials including a first material of relatively high work function and a second material of relatively low work function, said second material being interspersed with said first material along a face of said cathode facing toward the anode, the mean work function of the composition being higher than the work function of the material constituting the anode, an anode composed of material having a relatively low work function juxtaposed with said cathode and separated therefrom by a gap of less than 0.1 mm. across which an electrostatic potential is thus developed and sufficient to accelerate electrons emitted by said cathode thereacross so as at least to lessen the formation of a space charge in said gap, housing means forming an enclosure evacuated of any gases around said gap, circuit means for connecting said anode and said cathode across a load, and temperature control means for maintaining said anode below its electron emitting temperature during subjection of the cathode to heating sufficient to cause the emission of electrons into said gap.

2. A device according to claim 1, wherein said cathode is adapted and disposed to be heated by solar radiation.

3. A device according to claim 2, wherein said housing means includes a transparent bulb surrounding said anode and said cathode, said bulb being provided with sealed-in terminals respectively connected to said anode and said cathode.

4. A device according to claim 3, wherein said anode includes two plates flanking said cathode, one of said plates having an opening for the admission of solar radiation to said cathode.

5. A device according to claim 1 and where there is furthermore provided heating means for bringing said cathode to a temperature higher than that of said anode and sufficient to cause said cathode to emit electrons into said gap.

6. A device according to claim 5, wherein said heating means includes duct means for conveying a hot fluid to said cathode.

7. A device according to claim 5, wherein said cathode is formed as hollow tube through which heating fluid is adapted to pass and wherein said anode wholly surrounds said cathode.

8. A device according to claim 5, wherein said cathode is adapted for direct thermal contact with a hot surface.

9. A device according to claim 1, wherein said cathode comprises a first plate having a surface positioned in said housing for exposure to incident thermal radiation, said anode comprising a second plate adjacent the opposite surface of said first plate and shielded by it from said incident radiation.

10. A device according to claim 2, wherein said temperature control means includes a blackened surface of said anode.

11. A device according to claim 1, wherein said anode forms part of the housing means.

12. A device according to claim 11, wherein said cathode is nested in said anode.

13. A device according to claim 12, wherein said anode surrounds said cathode while leaving a part of said cathode exposed to the impingement of external radiation thereon.

14. A device according to claim 1, wherein said second material constitutes discrete particles imbedded in said first material flush with said face.

15. A device according to claim 1, wherein said second material is identical with the material of said anode.

16. A device for the conversion of thermal energy into electrical energy, comprising an electron emissive cathode composed of material having a relatively high work function, an anode composed of material having a relatively low work function, said anode including two plates flanking said cathode on opposite sides thereof, one of said plates having an opening for the admission of solar radiation to said cathode, said anode being separated from said cathode by a gap of less than 0.1 mm. across which an electrostatic potential is thus developed and sufficient to accelerate electrons emitted by said cathode thereacross so as at least to lessen the formation of a space charge in said gap, a transparent bulb surrounding said anode and cathode, and forming an enclosure evacuated of any gases around said gap, circuit means for connecting said anode and said cathode across a load, and radiating means on said anode for cooling said anode below its electron emitting temperature during subjection of the cathode to heating sufficient to cause emission of electrons therefrom into said gap.

17. A device according to claim 16 wherein said radiating means on said anode is a blackened surface thereon.

References Cited
UNITED STATES PATENTS

| | | | |
|---|---|---|---|
| 2,510,397 | 6/1950 | Hansell | 310—4 |
| 2,759,112 | 8/1956 | Caldwell | 310—4 |
| 2,975,320 | 3/1961 | Knauer | 310—4 X |
| 2,980,819 | 4/1961 | Feaster | 310—4 |
| 3,021,472 | 2/1962 | Hernqvist | 310—4 |

FOREIGN PATENTS 269,032  4/1927  Great Britain.

MILTON O. HIRSHFIELD, *Primary Examiner.*

ORIS L. RADER, *Examiner.*

J. W. GIBBS, *Assistant Examiner.*